(No Model.)

G. H. NICHOLLS.
COOKING UTENSIL.

No. 508,831. Patented Nov. 14, 1893.

WITNESSES:
John A. Rennie
C. Sedgwick

INVENTOR
G. H. Nicholls
BY
Munn & Co.
ATTORNEYS.

THE NATIONAL LITHOGRAPHING COMPANY,
WASHINGTON, D. C.

UNITED STATES PATENT OFFICE.

GEORGE HABBERTON NICHOLLS, OF GALVESTON, TEXAS.

COOKING UTENSIL.

SPECIFICATION forming part of Letters Patent No. 508,831, dated November 14, 1893.

Application filed April 27, 1893. Serial No. 472,060. (No model.)

*To all whom it may concern:*

Be it known that I, GEORGE HABBERTON NICHOLLS, of Galveston, in the county of Galveston and State of Texas, have invented a new and useful Improvement in Cooking Utensils, of which the following is a full, clear, and exact description.

This invention relates to an improvement in cooking utensils, and particularly to such as are used in the cooking of cereals and like food articles, that are boiled, steamed, or heated by the agency of boiling water, the objects being to provide a sauce-pan or other suitable vessel, with novel interior parts, that will facilitate the cooking of oatmeal, mush, grits, rice, or other cereals, without danger of their burning, dispensing with need of constant attention, and effecting the operation in a speedy, thorough manner.

To these ends, my invention consists in the construction and combination of parts, as is hereinafter described and claimed.

Reference is to be had to the accompanying drawings forming a part of this specification, in which similar letters of reference indicate corresponding parts in all the figures.

Figure 1:
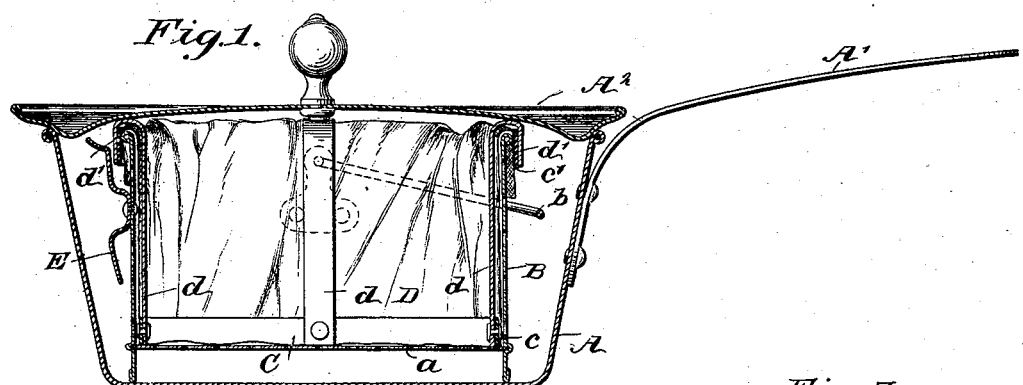
Figure 2:
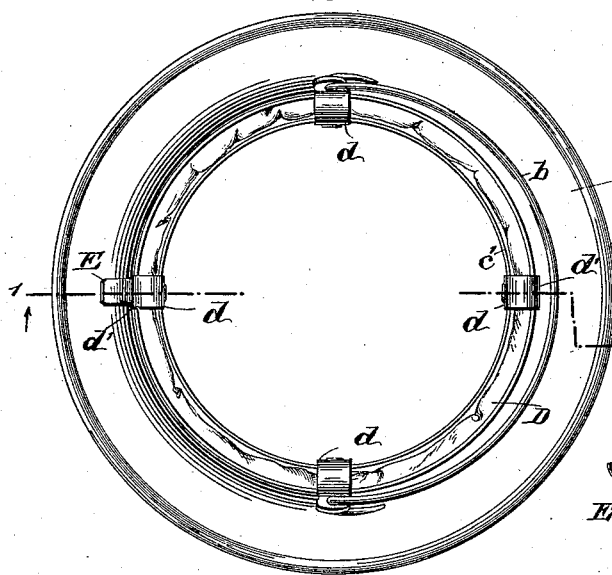
Figure 4:
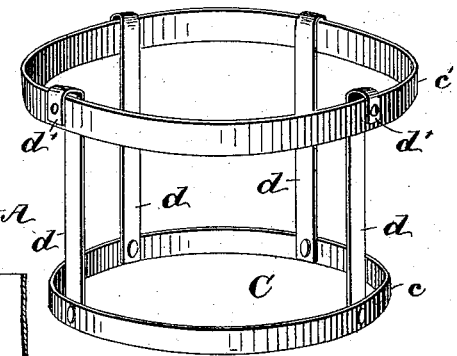
Figure 3:
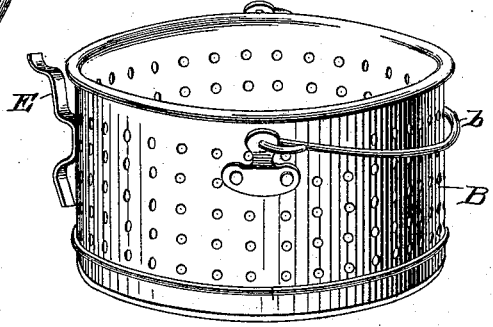
Figure 5:
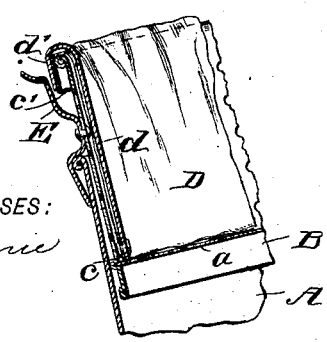

Figure 1 is a side view, in section on the line 1—1 in Fig. 2. Fig. 2 is a plan view with the part removed. Fig. 3 is a detached perspective view of a part of the improvement. Fig. 4 is a detached perspective view of another detail of the invention; and Fig. 5 is a partly sectional and broken detail of construction, containing features of the improvement.

A, represents a sauce-pan of ordinary construction having a handle A', and a cover A², said device being preferably used in connection with the parts comprising the improvement, consisting of a preferably cylindrical sheet metal vessel B, of any suitable dimensions, that should be less than the diameter of the sauce-pan A.

The vessel B, is provided with a perforated bottom wall $a$, which is located above the lower edge of the side wall a short distance, to afford water space below the bottom of the vessel, as indicated in Fig. 1. A bail handle $b$, is loosely secured on the vessel B, so as to fold as shown in Figs. 1 and 3, and the side wall of the vessel is foraminated for the free passage of water or steam.

Within the vessel B, a skeleton frame C, is loosely fitted, comprising two rings $c$, $c'$, and upright spacing bars $d$, secured at intervals on the rings. The upper ring $c'$, is of such an internal diameter as will adapt it to loosely encircle the outer side and upper edge of the vessel B, the bars $d$, having hook ends $d'$, formed on their upper portions, the depending outer parts of which hooks are lapped upon the outer surface of the ring $c'$, and thereto secured, the length of the bars that are affixed by their lower ends to the ring $c$, permitting the latter to nearly touch the inner surface of the bottom well $a$.

A fibrous envelope B, is furnished, which may be made of any suitable woven material such as muslin, the dimensions of the piece of fabric being sufficient to permit it to completely cover the exterior of the skeleton frame C, and project above its ring $c'$.

The fabric D, is introduced between the frame C, and interior surface of the vessel B, and drawn smoothly upon the frame which it incases.

When the culinary utensil afforded by the described construction, is to be used for the cooking of food articles, such as are prepared from crushed or whole grains of oats or other cereals, the proper quantity of meal or grains is placed in the vessel B, after the frame C, and its envelope D, are in position therein, the material which is to be cooked being deposited on the fibrous envelope. A sufficient supply of water is now introduced within the sauce-pan A, to cook the food article, which should if it is oatmeal be thoroughly mixed with water or milk before placing in the cooking utensil. The sauce-pan is now covered, and heat applied to it, which will quickly heat the food article in the chamber B, and cook it without scorching it, dispensing with the constant attention of the cook to prevent the latter, as is necessary if the ordinary sauce pan alone is employed for the purpose. There is a depending hook E, secured upon the outer surface of the vessel B, at a proper point which will allow it to engage the upper edge of the sauce-pan A, and support the vessel and its contents, so that excessive moisture in the latter may drain therefrom.

The device can be quickly and perfectly cleaned by a removal of parts from connection with each other, and may be kept in such a condition by covering the sauce-pan with its lid.

It will be seen that the sauce-pan may be made of earthenware if preferred, and that the vessel B, may be coated with a non-oxidating material to prevent rust.

It is claimed that the improvement is simple, inexpensive, and effects superior results to devices for a like purpose of ordinary form.

Having thus described my invention, what I claim as new, and desire to secure by Letters Patent, is—

1. The combination with a water receptacle, of a foraminated vessel, a skeleton frame adapted to hook upon the top edge of the vessel, and a fibrous envelope intervening the frame and vessel, substantially as described.

2. The combination with a water receptacle, having a handle and a cover, of a foraminated cylindrical vessel the bottom of which is located above the lower edge of the side wall, a bail handle for the vessel, a skeleton frame having hooks that engage the top edge of the vessel, an intervening fibrous envelope, and a hanger hook on the outer side of the foraminated vessel, substantially as described.

GEORGE HABBERTON NICHOLLS.

Witnesses:
A. E. PAINTER,
FRED W. FICKETT.